May 26, 1931.   J. McC. EDWARDS   1,806,748
BEARING PROTECTOR
Filed March 24, 1927
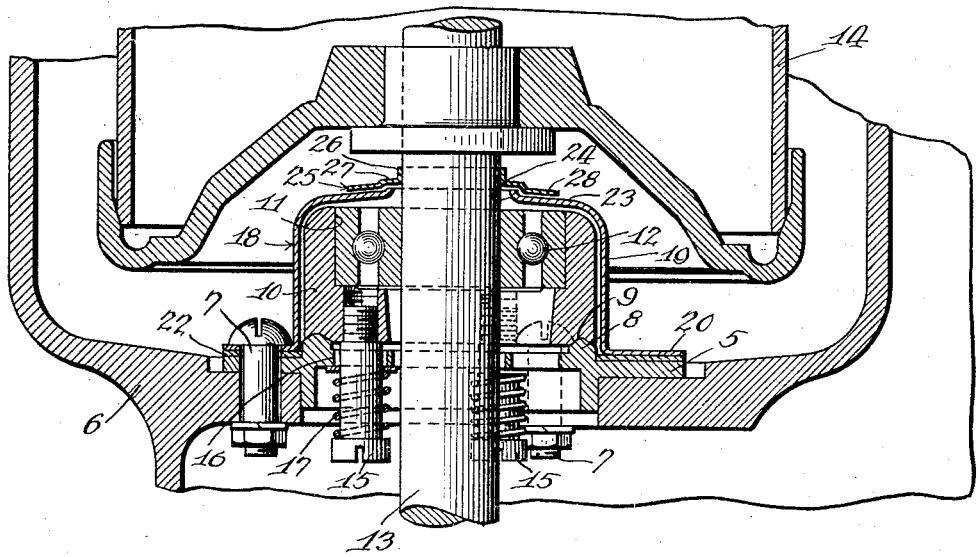
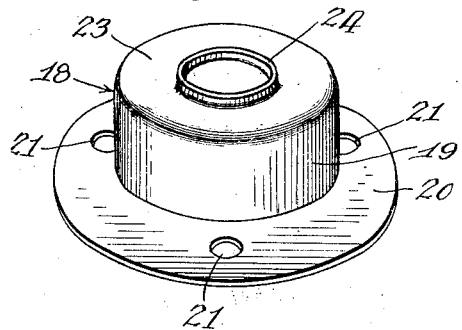
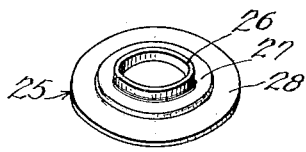
Inventor
James McCosh Edwards
By Arthur L. Sprinkle
Atty.

Patented May 26, 1931

1,806,748

UNITED STATES PATENT OFFICE

JAMES McCOSH EDWARDS, OF WATERLOO, IOWA, ASSIGNOR TO IOWA DAIRY SEPARATOR COMPANY, A CORPORATION OF IOWA

BEARING PROTECTOR

Application filed March 24, 1927. Serial No. 177,909.

This invention relates to improvements in bearing protectors, and is particularly adapted for use in machines employing vertical spindles and bearings therefor, as, for example, in cream separators and the like, wherein it is desired to protect the bearing from dust, water, milk and other foreign substances, which, if permitted to enter the bearing, would seriously interfere with its proper functioning, and tend to destroy the efficiency of the lubricant used in the bearing.

One of the objects of the present invention is to provide a dust cap of simple and inexpensive construction, and which may be readily and securely attached to a fixed or stationary part of the bearing structure.

Another object of the invention is to provide a dust cap constructed of a single piece of material drawn or otherwise formed into the desired shape for effectually protecting the bearing, and capable of being so positioned with respect to the bearing as not to interfere in any way with the operation of the bearing, as in the type shown and described, the free rotation and automatic centering of the movable portion of the bearing and spindle shaft.

A further object of the invention is to provide a novel construction of shield or deflector adapted to co-operate with my improved dust cap in a manner to reduce to a minimum, the possibility of any foreign matter entering the bearing, thereby obtaining the highest degree of efficiency possible from the use of my invention as a bearing protector for centrifugal machines.

A still further object of the invention is to improve devices of this character in sundry details hereinafter described and particularly pointed out in the appended claims.

One embodiment of the invention is shown for illustrative purposes in the accompanying drawings, in which Fig. 1 is a central vertical sectional elevation of a portion of a cream separator and spindle bearing thereof, illustrating an embodiment of my improved bearing protector and deflector shield applied thereto.

Fig. 2 is a perspective view of the dust cap shown in Fig. 1.

Fig. 3 is a perspective view of the deflector shield illustrated in Fig. 1.

The spindle bearing to which an embodiment of my invention is shown applied, is of the yielding self centering type of ball bearing, and comprises a base plate 5 adapted to be rigidly secured to the main frame 6 of a separator or the like, by means of a plurality of annularly spaced bolts 7. Formed on the upper side of the base plate 5 is a raised double-bevelled annular ridge 8 adapted to receive the recessed annular groove 9 formed on the underside of a yielding bearing box 10, the said box having formed in its upper end portion a socket 11 in which is positioned a ball bearing assembly 12. The ball bearing assembly 12 is adapted to receive through its central portion a vertically disposed spindle or shaft 13 suitably supported at its lower end and carrying at its upper end a bowl 14 of a cream separator or the like.

To provide for suitable elasticity in the bearing to take up the side thrust and gyrating motion of the spindle 13 in bringing the spindle and bowl up to speed, the bearing box 10 is movably mounted on the ridge 8 and held yieldingly thereon by means of a plurality of annularly spaced bolts 15 extending through slightly larger apertures 16 in the base plate 5 in a manner to provide suitable clearance for the bolts 15, which are screw threaded at their upper ends into the bearing box 10, the said bolts 15 being provided between their head portions and the underside of the base plate 5 with compression springs 17. It will be observed from the foregoing description that when the side thrust or gyrations of the spindle shift the bearing box 10 laterally on the bevelled faces of the ridge 8, the springs will yield sufficiently to permit of such movement, and when the side thrust is removed and the gyrations cease, the force of the springs 17 acting between the heads of the bolts 15 and the base plate 5, and in co-operation with the bevelled faces of the ridge 8 and the groove 9 formed in the bearing box, tend to return the bearing box 10 to its normal or central position with respect to the ridge 8.

For protecting the ball bearing and associated parts from dust, water, milk or other foreign substances, which, if permitted to enter the bearing, would seriously interfere with its operation, a dust cap 18 is provided, constructed preferably of a single piece of sheet metal drawn or otherwise formed into an inverted cup-like formation and provided with annular side walls 19 and with a radially disposed laterally extending flange 20 adjacent the lower end of said side walls, the said flange having a plurality of annularly spaced apertures 21 adapted to receive the bolts 7 by which the cap is rigidly secured to the base plate 5. If desired, a gasket 22 may be positioned between the flange 20 and base plate 5 for excluding the entrance of water, milk or other foreign substances at this point.

The upper end of the cap 18 is provided with an inwardly extending top portion 23 and a vertically disposed upstanding annular flange 24 adapted to form a central opening in said top portion 23 through which the spindle or shaft 13 extends. Secured frictionally to the shaft 13 above the cap 18 is a deflector shield 25 having a vertically disposed annular sleeve portion 26 adapted to fit snugly around the spindle and by which the shield is secured to the spindle in a manner to rotate therewith. Surrounding the sleeve portion 26 of the shield 25 and formed integrally therewith is a radially disposed outwardly extending inclined body portion 27 adapted to overlie the opening and flange 24 formed on the cap 18, the said portion 27 being positioned slightly above the upper edge of the flange 24 in a manner to provide a slight clearance between the cap and deflector shield. Surrounding the central inclined portion 27 of the deflector shield 24 and formed integrally therewith is a radially disposed outwardly extending inclined rim or marginal portion 28, the inclined plane of said marginal portion being offset or depressed with respect to the inclined plane of said central portion 27, thus positioning the inclined marginal portion 28 below the horizontal plane of the upper edge of the flange 24 and in close proximity to the top portion 23 of the cap 18.

It will be noted from the foregoing description that any dust, water, milk or other foreign matter deposited on the deflector shield 25 will be thrown off by centrifugal force due to the rapid rotation of the shaft 13 and deflector shield, and that by reason of the close proximity of the marginal portion 28 of the shield 25 to the top portion 23 of the dust cap 18, the possibility of any foreign matter working its way inwardly between the cap and shield and upwardly over the flange 24 of the cap is reduced to a minimum, thereby providing a most efficient protection against the entrance of foreign matter into the opening formed in the top portion 23 of the cap 18, and at the same time providing sufficient clearance between the cap and deflector shield.

It will be observed from the foregoing specification that the present invention provides a dust cap and a deflector shield of simple and inexpensive construction, which may be formed of single pieces of sheet material.

The invention further provides a construction and arrangement wherein the possibility of foreign matter entering the bearing is reduced to a minimum, thereby obtaining a high degree of efficiency from bearings equipped with my invention after the manner above described.

Obviously, the present invention is not limited to the precise construction and arrangement shown and described, as the same may be variously modified without departing from the spirit and scope of the invention as set forth in the appended claims.

What I claim as my invention and desire to secure by Letters Patent is:

1. The combination with a bearing having a shaft mounted therein, of a dust cap surrounding said bearing and having a top portion and an opening formed therein adapted to receive said shaft, a vertically disposed upstanding annular flange formed on said cap adjacent said opening, a deflector shield having an annular sleeve portion adapted to be frictionally secured to said shaft above said cap, said shield having a radially disposed outwardly extending central portion positioned above and closely adjacent said upstanding annular flange formed on said cap and adapted to overlie said opening, and a radially disposed outwardly extending marginal portion formed on said shield and offset downwardly from the plane of the central portion thereof in a manner to occupy a position below the horizontal plane of the upper edge of the flange formed on said cap and closely adjacent the top portion of said cap, the said marginal portion being adapted to extend a substantial distance outwardly of the opening formed in said cap and said upstanding annular flange on the cap.

2. A deflector shield formed from an integral piece of sheet metal comprising a vertically disposed annular sleeve portion adapted to be frictionally attached around a vertically rotatable shaft, a radially disposed outwardly extending downwardly inclined central portion surrounding said sleeve portion, and a radially disposed outwardly extending downwardly inclined marginal portion surrounding said central portion, the inclined plane of said marginal portion being offset downwardly and extending substantially parallel with respect to the inclined plane of said central portion.

In testimony whereof I have signed my name to this specification, on this 17th day of March, A. D. 1927.

JAMES McCOSH EDWARDS.